G. HELFRICH.
Machines for Cutting Glass in Oval Forms.

No. 148,119. Patented March 3, 1874.

WITNESSES:

INVENTOR:

BY

ATTORNEYS.

UNITED STATES PATENT OFFICE.

GEORGE HELFRICH, OF BOSTON, MASSACHUSETTS.

IMPROVEMENT IN MACHINES FOR CUTTING GLASS IN OVAL FORMS.

Specification forming part of Letters Patent No. 148,119, dated March 3, 1874; application filed February 14, 1874.

*To all whom it may concern:*

Be it known that I, GEORGE HELFRICH, of Boston, in the county of Suffolk and State of Massachusetts, have invented a new and Improved Machine for Cutting Glass in Oval Forms, of which the following is a specification:

My invention consists of a table, on which the glass to be cut is secured by clamps, having on its under side an inverted slotted disk of a trammel or ellipsograph, and supported in a large ring, so as to be revolved to turn the trammel-plate around the blocks of the trammel-bar, which is held stationary in the frame or base of the machine as to the rotation of the disk, but may have endwise motion, and supports, by standards rising up from it on opposite sides of the base, a horizontal bar, which passes over the glass-holding plate, and supports a holder for the cutter, under which the glass is carried by turning the plate to which it is clamped to cut the glass. By shifting the holder-cutter toward and from the center, the tool is adjusted for cutting different sizes, and by shifting the blocks of the trammel-bar, which works in the slots of the disks, toward and from each other, the apparatus is adjusted for cutting ovals of any required form. A rack and pinion are arranged with one of said blocks for changing it.

Figure 1:
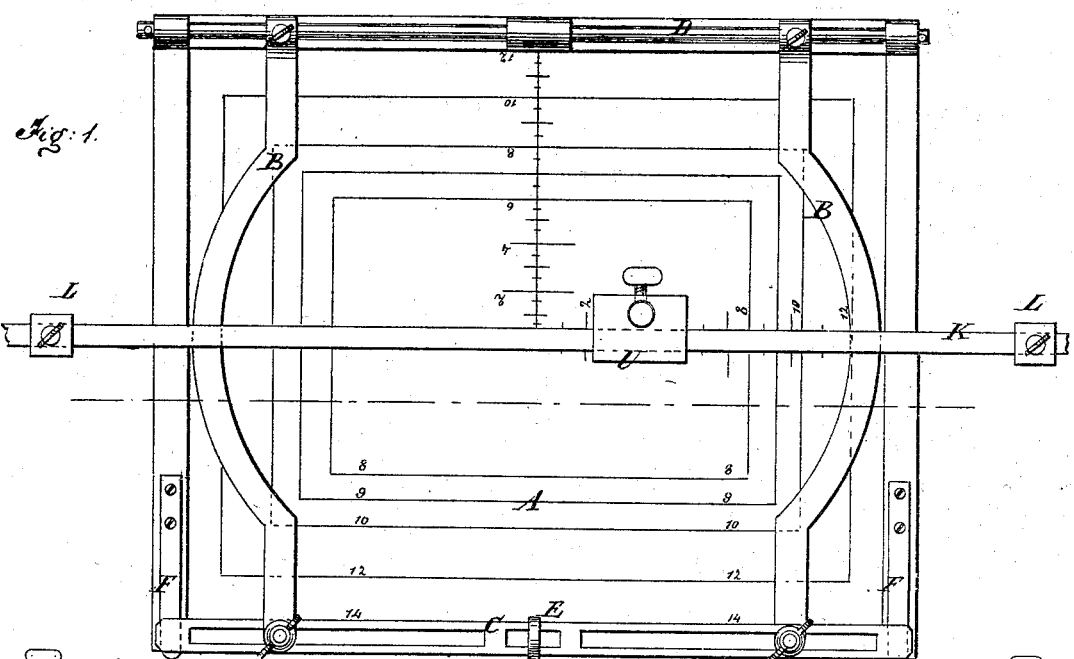
Figure 2:
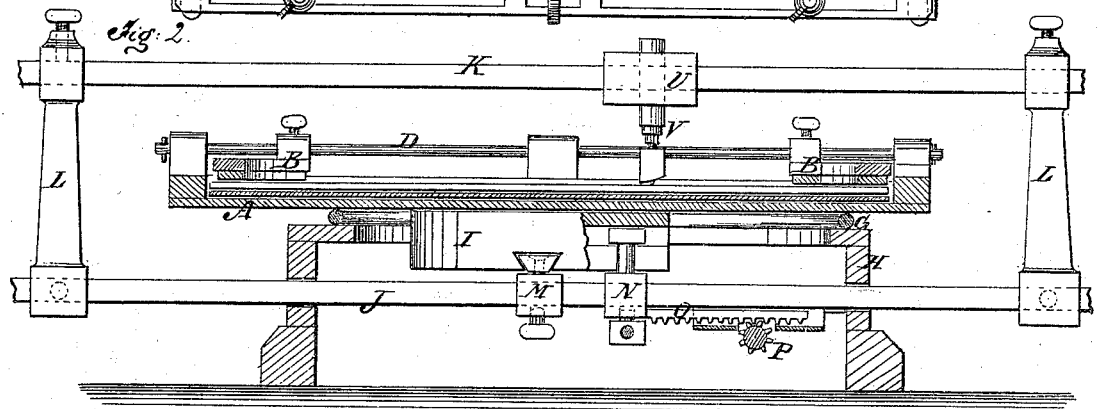
Figure 3:
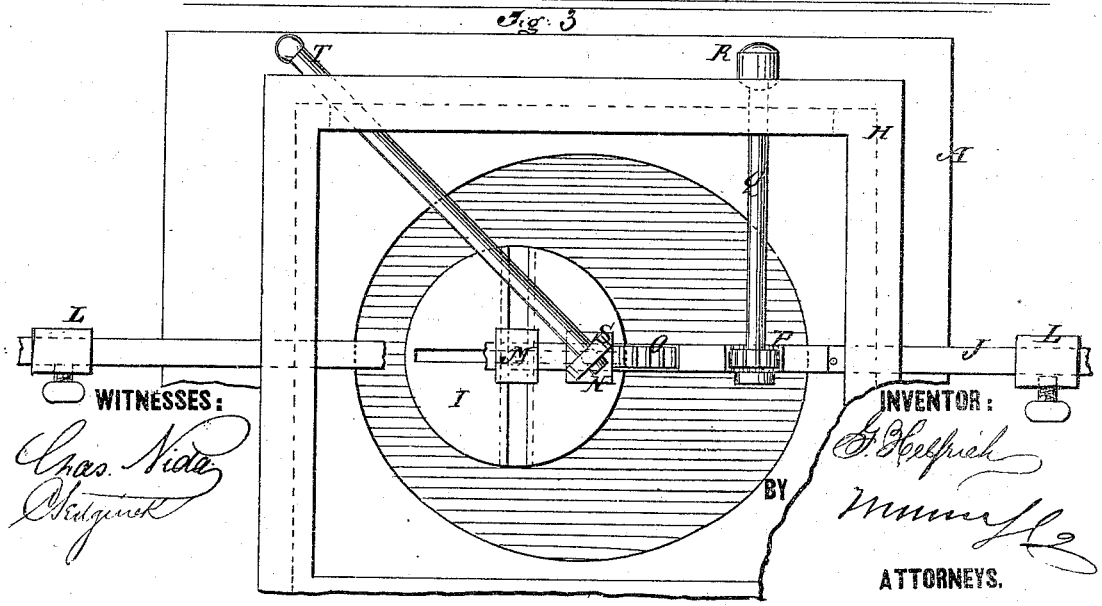

Figure 1 is a plan view of my improved oval-glass-cutting machine. Fig. 2 is a longitudinal section, and Fig. 3 is a plan of the bottom.

A is the glass holding and carrying board or table, which has suitable lines and gage-marks on its surface, preferably on a cover of white binder's-board, by which to adjust the glass plates properly, and it also has clamping-bars B C, for fastening the glass plates to be cut, the cross-bars B being adjustable along the rod D, whereon they are pivoted for plates of different sizes. They are also curved in the middle portion, so as to allow the tool to run to the end of the glass plate at the middle, while they bear on it sufficiently to hold it each side of the middle. They are also adjustable along the bar C, which rises and falls with them, and drops below the button E, to be fastened by it. F represent springs, on which the bar C falls, to guard it from striking the glass and breaking it. This table rests on a large ring-support, G, on the top of a hollow base, H, and has an inverted trammel-disk, I, attached to it centrally. J is the bar of the trammel, which extends both ways through the base H, and considerably beyond it, to support the horizontal tool-supporting bar K by standards L, wide enough apart to allow the latter to turn freely between them. They are fixed adjustably on the bar, so that they can be brought nearer together when cutting small plates for supporting the tool-bar more firmly. They are also adjustable along the tool-bar. To facilitate the adjustment of the blocks M N of the trammel for varying the shape of the ovals, the one N has a toothed bar, O, running along bar J, and gearing with a pinion, P, on the shaft Q, extending out through the base H, where a handle, R, on it can be conveniently manipulated for changing the block, and the binding screw or cam S for fastening it has a lever, T, extending out through a long slot in the base, for convenience in turning it for fastening the block. W is the tool-holder on the bar K. It is adjustable along said bar to set it for different sizes. V is the tool.

The trammel-bar may be fixed in the base, so as not to move endwise, if preferred, in which case the table will revolve in an elliptical orbit; or the table may be confined on its ring-support G, and the bar allowed to move forward and back, while the table revolves on a fixed center.

It will be seen that ovals of any size and form may be cut with great facility by this machine.

Having thus described my invention, I claim as new and desire to secure by Letters Patent—

1. The combination of a revolving glass-holding table, a trammel mechanism, and a cutter-holder, substantially in the manner herein described.

2. The combination of the hinged and adjustable clamping-bars B C, fastening E, and springs F with the glass-holding table, substantially as specified.

3. The adjusting trammel-block N, provided with the toothed rack O, pinion P, and shaft Q, for shifting it from outside of the base, substantially as specified.

4. The binding screw or cam S, provided with the actuating-lever T, extending outside of the base, substantially as specified.

5. The trammel-bar J, extended beyond the base and the table, and supporting the tool-bar K by standards L, substantially as specified.

GEORGE HELFRICH.

Witnesses:
R. C. LINCOLN,
H. G. PICKERING.